(12) United States Patent
Shukla et al.

(10) Patent No.: US 12,480,770 B2
(45) Date of Patent: Nov. 25, 2025

(54) PICKUP ASSISTANCE SYSTEM

(71) Applicant: Uber TEchnologies, Inc., San Francisco, CA (US)

(72) Inventors: Anjini Shukla, Los Altos, CA (US); Pranit Arora, San Francisco, CA (US); Ashutosh Joshi, Fremont, CA (US); Miles Lucas Detrixhe, San Francisco, CA (US); Ruofei Wang, Foster City, CA (US)

(73) Assignee: Uber Technologies, Inc., San Francisco, CA (US)

( * ) Notice: Subject to any disclaimer, the term of this patent is extended or adjusted under 35 U.S.C. 154(b) by 281 days.

(21) Appl. No.: 18/056,277

(22) Filed: Nov. 17, 2022

(65) Prior Publication Data

US 2023/0152105 A1 May 18, 2023

Related U.S. Application Data

(60) Provisional application No. 63/264,222, filed on Nov. 17, 2021.

(51) Int. Cl.
*G01C 21/34* (2006.01)
*G01C 21/36* (2006.01)

(52) U.S. Cl.
CPC ..... *G01C 21/3438* (2013.01); *G01C 21/3617* (2013.01); *G01C 21/362* (2013.01); *G01C 21/3691* (2013.01)

(58) Field of Classification Search
CPC ............ G01C 21/3438; G01C 21/3617; G01C 21/362; G01C 21/3691; G06Q 10/04; G06Q 50/40
See application file for complete search history.

(56) References Cited

U.S. PATENT DOCUMENTS

| | | | |
|---|---|---|---|
| 2008/0042882 A1* | 2/2008 | Horstemeyer | H04M 3/487 718/100 |
| 2012/0041675 A1* | 2/2012 | Juliver | G06Q 10/08 701/465 |
| 2019/0316926 A1* | 10/2019 | Wang | G01C 21/3484 |
| 2020/0309552 A1* | 10/2020 | Palande | G01C 21/206 |
| 2020/0326194 A1* | 10/2020 | Wang | G05D 1/0272 |

* cited by examiner

*Primary Examiner* — Anne Marie Antonucci
*Assistant Examiner* — Jewel Ashley Kuntz
(74) *Attorney, Agent, or Firm* — Schwegman Lundberg & Woessner, P.A.

(57) ABSTRACT

Example embodiments are directed to systems and methods for providing pickup point assistance. In example embodiments, a network system uses data received from one or more sensors to detect a location of a user that is requesting a transportation service. The network system also tracks, a driver along a route to the pickup point. Based on the tracking, an estimated time of arrival (ETA) of the driver at the pickup point is determined. Using the location of the user and the ETA of the driver, the network system performs analysis to determine whether an issue exists that affects the rider arriving at the pickup point on time to meet the driver. Based on the analysis, a notification to the user regarding the issue is automatically presented, whereby the notification is displayed on a device of the user.

18 Claims, 7 Drawing Sheets

PICKUP ASSISTANCE SYSTEM

CROSS REFERENCE TO RELATED APPLICATIONS

This application claims priority to U.S. Provisional Patent Application No. 63/264,222, filed Nov. 17, 2021, and entitled "Pickup Assistance System." The contents of this prior application are considered part of this application and are hereby incorporated by reference in its entirety.

TECHNICAL FIELD

The subject matter disclosed herein generally relates to machines configured for providing pickup assistance. Specifically, the present disclosure addresses systems and methods that predict potential issues associated with a pickup or pickup point in order to provide pickup assistance.

BACKGROUND

In a transportation service, between a time a rider agrees to be picked up and when a driver actually arrives at the pickup point, many things can go wrong that can prevent the pickup at an intended time (e.g., when the driver arrives at the pickup point). For instance, the rider may be habitually late to pickup points, a distance that the rider needs to walk to reach the pickup point may be far, or aspects of an area about the pickup point (e.g., geography, traffic) may make the pickup point hard to rendezvous at (e.g., driver cannot stop for long, driver unable to pull over at designated spot). These issues may cause trip cancelations or delays in the trips.

BRIEF DESCRIPTION OF THE DRAWINGS

Some embodiments are illustrated by way of example and not limitation in the figures of the accompanying drawings.

DETAILED DESCRIPTION

Figure 1:
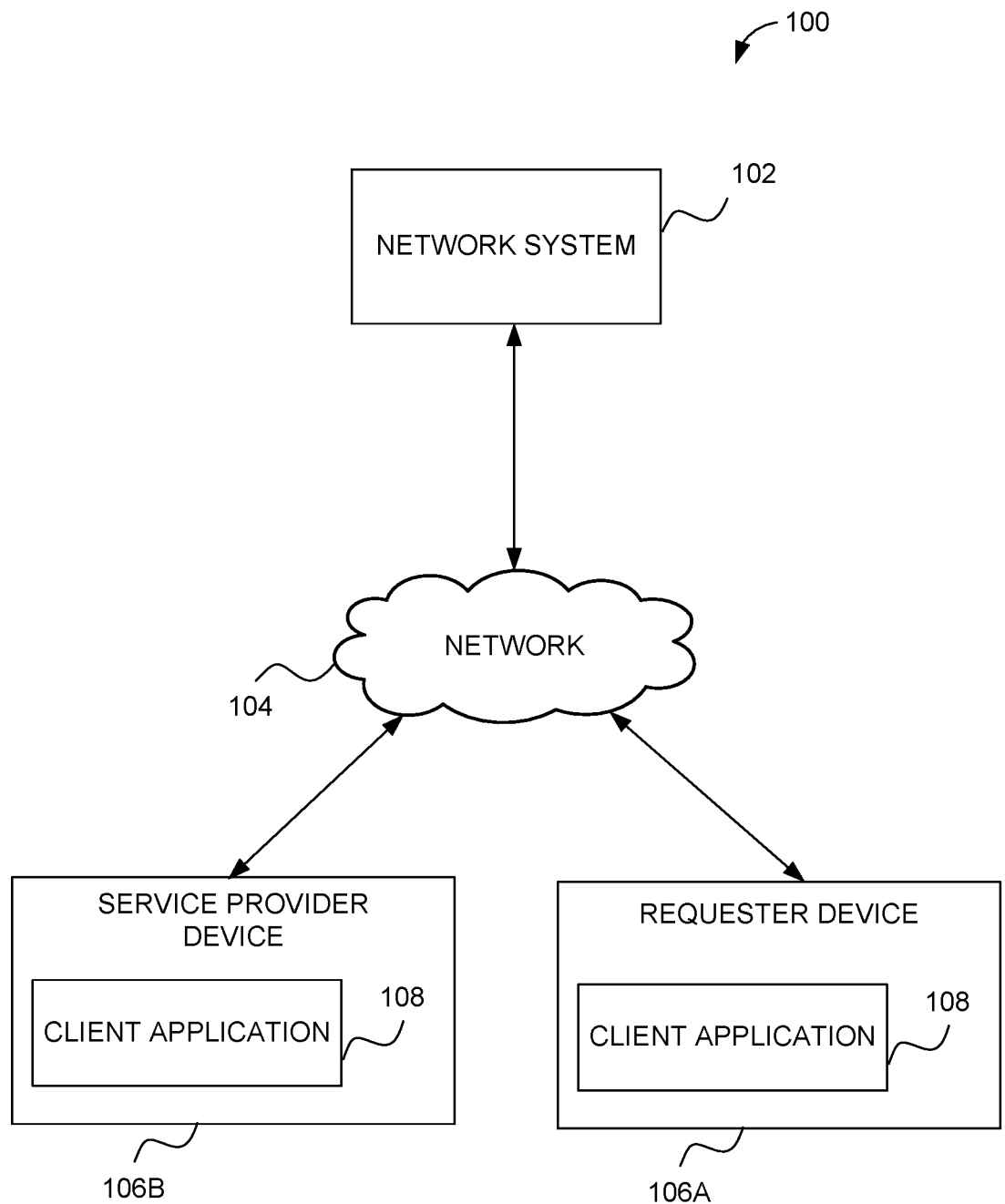
FIG. 1 is a diagram illustrating a network environment suitable for providing a pickup assistance system, according to example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

In a transportation service, riders and drivers have to overcome various friction to successfully complete a pickup. In some cases, riders may be late to pickup points. In other cases, the riders may be far from their pickup points. Further still, there may be aspects of the area about the pickup point that may cause issues with riders getting to the pickup point or finding their driver or issues with the driver being able to stop. All of these situations may result in drivers having to wait for their riders, delays in trips, or trip cancellations.

Example embodiments are directed to providing pickup point assistance. Some of the pickup point friction can be detected in real time by a network system. The network system can then influence the behavior of either the rider or the driver so that there still can be a chance that the pickup will occur on time (e.g., the driver does not need to wait for the rider). Example embodiments use historical trip data and real-time, monitored data to determine whether the user may be late to a pickup point (e.g., whether the user is habitually late given the same conditions/factors; whether the user is far from the pickup point and may not reach the pickup point in time) or if there is some issue with an area of the pickup point (e.g., hard to stop at) that warrants the network system automatically pushing a notification or nudge to the rider, and in some cases, to the driver.

In example embodiments, the network system uses data received from one or more sensors to detect a location of a user that is requesting a transportation service. The network system also tracks, a driver along a route to the pickup point. Based on the tracking, an estimated time of arrival (ETA) of the driver at the pickup point is determined. Using the location of the user and the ETA of the driver, the network system performs analysis to determine whether an issue exists that affects the rider arriving at the pickup point on time to meet the driver. In some embodiments, the analysis is performed using a machine learning model that is trained, by the network system, based on various combinations of factors/conditions from historical trip data. Based on the analysis, automatic transmission of a notification to the user regarding the issue is triggered, whereby the notification is displayed on a device of the user.

Thus, the present disclosure provides technical solutions for predicting whether there may be issues with a rider arriving on time at a pickup point and/or whether there will be issues with the pickup point, itself, and automatically transmitting a notification based on the prediction. The technical solutions also provide mechanisms to train one or more machine learning models that are used at runtime to determine whether there may be an issue with the user arriving at the pickup point on time. As such, the present disclosure provides a technical solution that addresses predicting potential issues with a pickup and automatically providing notifications when warranted.

FIG. 1 is a diagram illustrating a network environment 100 suitable for providing pickup assistance. The network environment 100 includes a network system 102 communicatively coupled via a network 104 to a requester device 106a of a rider and a service provider device 106b of a driver (collectively referred to as "user devices 106"). In example embodiments, the network system 102 comprises components that obtain, store, and analyze data received from the user devices 106. The data (referred to as "trip data") can be analyzed to determine whether to provide pickup assistance with respect to a pickup point, in accordance with some embodiments. The components of the network system 102 are described in more detail in connection with FIG. 2 and may be implemented in a computer system, as described below with respect to FIG. 7.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the user devices 106 are portable electronic devices such as smartphones, tablet devices, wearable computing devices (e.g., smartwatches), or similar devices. Alternatively, the service provider device 106b can correspond to an on-board computing system of a vehicle. The user devices 106 each comprises one or more processors, memory, touch screen displays, wireless networking system (e.g., IEEE 802.11), cellular telephony support (e.g., LTE/GSM/UMTS/CDMA/HSDP A), and/or location determination capabilities. The user devices 106 interact with the network system 102 through a client application 108 stored thereon. The client application 108 of the user devices 106 allow for exchange of information with the network system 102 via user interfaces, as well as in background. For example, the client application 108 running on the user devices 106 may determine and/or provide location information (e.g., current location in latitude and longitude), speed, and times (e.g., timestamps) associated with portions of the trip, via the network 104, for storage and analysis. In some embodiments, the trip data is used by the network system 102 to determine whether to provide pickup assistance with respect to a pickup point.

In example embodiments, a first user (e.g., a requester or rider) operates the requester device 106a that executes the client application 108 to communicate with the network system 102 to make a request for a transportation service such as transport or delivery service (referred to collectively as a "trip"). In some embodiments, the client application 108 determines or allows the first user to specify/select a pickup point (e.g., of the user or an item to be delivered) and to specify a drop-off location or destination for the trip. The client application 108 also presents information, from the network system 102 via user interfaces, to the user of the requester device 106a, such as notifications.

A second user (e.g., a service provider or driver) operates the service provider device 106b to execute the client application 108 that communicates with the network system 102 to exchange information associated with providing transportation service (e.g., to the user of the requester device 106a). The client application 108 presents information via user interfaces to the user of the service provider device 106b, such as invitations to provide the transportation service, navigation instructions (e.g., a route to a pickup point or destination), and notifications, such as a notification that the rider may be late to the pickup point. The client application 108 also provides data to the network system 102 such as a current location (e.g., coordinates such as latitude and longitude), speed, heading, and/or times associated with events during navigation by the service provider device 106b or vehicle.

In example embodiments, any of the systems, machines, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined into a single system or device, and the functions described herein for any single component may be subdivided among multiple components (e.g., systems or devices). Additionally, any number of user devices 106 may be embodied within the network environment 100. Furthermore, some components or functions of the network environment 100 may be combined or located elsewhere in the network environment 100. For example, some of the functions of the networked system 102 may be embodied within other components of the network environment 100. Additionally, some of the functions of the user device 106 may be embodied within the network system 102. While only a single network system 102 is shown, alternative embodiments may contemplate having more than one network system 102 to perform server operations discussed herein for the network system 102.

Figure 2:
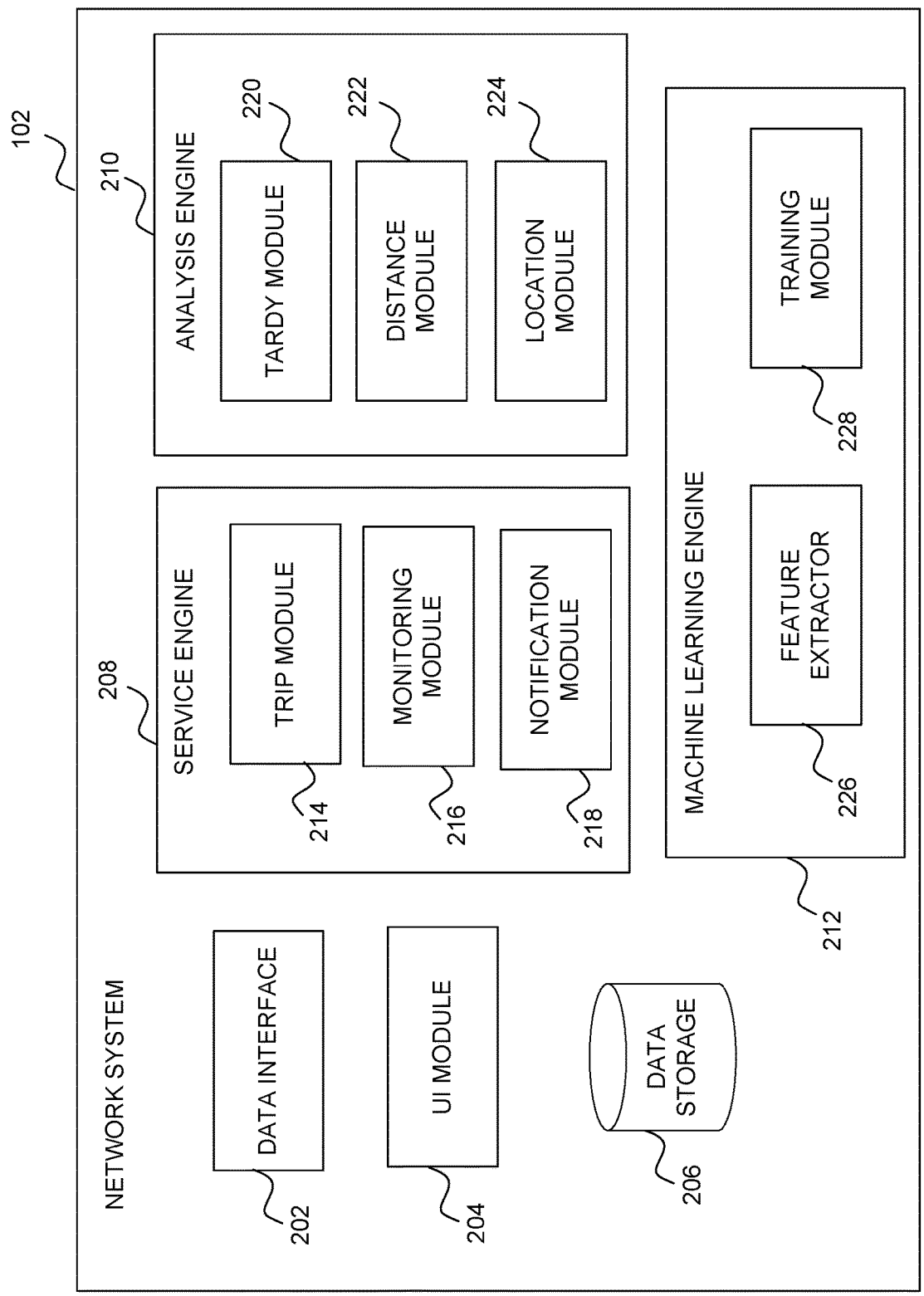
FIG. 2 is a block diagram illustrating components of a network system for providing pickup assistance, according to example embodiments.

FIG. 2 is a block diagram illustrating components of the network system 102, according to some example embodiments. In various embodiments, the network system 102 obtains and stores trip data (e.g., locations of user devices, speed, direction, timestamps of events) received from the user devices 106. The network system 102 then analyzes the trip data, both current (e.g., real-time) and historical, to determine whether to provide pickup assistance. In example embodiments, the pickup assistance comprises a notification that is pushed to the user device 106 at an appropriate time prior to pick up. In some embodiments, determination of whether to provide pickup assistance uses a machine learning model that is trained and retrained with historical trip data, as will be discussed in more detail below. To enable these operations, the network system 102 comprises a data interface 202, a user interface (UI) module 204, a data storage 206, a service engine 208, an analysis engine 210, and a machine learning engine 212 all configured to communicate with each other (e.g., via a bus, shared memory, or a switch).

The network system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The data interface 202 is configured to exchange data with the user devices 106 and cause presentation of one or more user interfaces provided by the UI module 204 on the user devices 106 (e.g., via the client application 108) including user interfaces to display a pickup assistance notification. The device interface 202 also receives trip data from the user devices 106 before, during, and after a trip. The trip data can include location information such as GPS traces (e.g., latitude and longitude with timestamp), speed, times (e.g., timestamps) associated with events that occur during each trip (e.g., pickup time), and input or feedback from users at the user devices 106. The trip data is stored to the data storage 206 by the data interface 202 for analysis.

The UI module 204 is configured to generate user interfaces. In some cases, the user interfaces include notifications that are generated by the service engine 208. These notifications may be transmitted via the data interface 202 and displayed by the client application 108. In other cases, the notifications may be displayed on a home screen of the requester device 106*a*.

The data storage 206 is configured to store information associated with each user of the network system 102 including the trip data. The stored information includes, for example, past trips, saved or frequently selected pickup points or destinations (e.g., home, work), and user preferences. In some embodiments, the trip data is stored in or associated with a user profile corresponding to each user and includes a history of interactions using the network system 102. While the data storage 206 is shown to be embodied within the network system 102, alternative embodiments can locate the data storage 206 elsewhere and the data storage 206 be communicatively coupled to the network system 102. Furthermore, while only a single data storage 206 is shown in FIG. 2, more than one data storage 206 may be provided. For example, a first data storage can store trip data and user profile data and a second data storage can store 3P data.

The service engine 208 manages aspects of the transportation service including establishing a trip, generating routes, monitoring users before and during a trip, and providing notifications including nudges to users (e.g., riders) to proceed to a pickup point. To enable these operations, the service engine 208 comprises a trip module 214, a monitoring module 216, and a notification module 218. The service engine 208 may comprise other components (not shown) that are not pertinent to example embodiments.

The trip module 214 is configured to establish a trip based on a service request and generate routes for a service provider from an origin to a destination. The routes can be generated using any route generation systems or algorithms known to those skilled in the art. In example embodiments, the origin is a starting point of the route. Thus, for example, the origin can be a location of the driver when the driver starts driving or accepts a request to provide transportation service to a rider and the destination is the pickup point of the rider. Alternatively, the route can comprise an origin that is the pickup point of the rider (or item to be delivered) and a destination that is the drop-off point of the rider (or the item). Further still, the route may just be between two locations that a driver wants to travel. In various cases, the generated routes are generated based on being the fastest, shortest, lowest cost, based on user preferences (e.g., avoid freeways, avoid hills, scenic route, frequently driven route), are frequently driven or selected by other users of the network system 102, or selected by the network system 102 based on other reasons or criteria.

The monitoring module 216 tracks the users and their user devices 106 throughout the transportation service. For example, the monitoring module 216 monitors navigation by the service provider of a routeline of a generated route to the destination. In example embodiments, the monitoring module 216 may receive location information (e.g., GPS coordinates) from one or more sensors associated with the user devices 106 in substantially real-time. Using the GPS information, the monitoring module 216 can identify where on the routeline the service provider device 106*b* is located. The monitoring module 216 can then determine an estimated time of arrival (ETA) to the pickup point. Further still, the monitoring module 216 monitors a location of a rider (or requester). Based on the location, the monitoring module 216 can detect whether the rider is moving towards the pickup location or at the pickup location.

The notification module 218 is configured to automatically generate and provide notifications including nudges to user at the requester device 106*a*. The notification module 218 is triggered by the analysis engine 210, based on its analysis, to generate and present the notifications on the requester device 106*a*. In some embodiments, the analysis engine 210 may indicate a type of notification to provide to the user, while in other embodiments, the notification module 218 determines the type of notification to provide. For example, the notification may indicate that the user can avoid being charged a late fee by showing up on time for their pickup; that the driver is on his way and to be sure to meet on time for pickup; that the user should leave now to get to the pickup on time; that it will take X minutes to get to the pickup by Y time; or that the user can keep their drop-off schedule on track by arriving early to the pickup point.

Other types of notifications or actions, in addition to or instead of a nudge to start traveling to the pickup point, can be provided by the notification module 218. For example, the notification module 218 may provide an option to the user to change their pickup point closer to their current location. In another example, the notification module 218 may provide a walking map (e.g., for a location that is difficult to navigate) to help guide the user to the pickup point. Further still, the notification may suggest that the user contact the driver (e.g., call or text) to arrange for the pickup for a difficult pickup point or warn the user that the pickup point is a difficult location for the driver to stop at, so they should arrive early.

In some embodiments, the notification module 218 provides a notification to the driver at the service provider device 106*b*. For example, the driver may be notified that the rider may be late to the pickup point. Alternatively, the notification may suggest that the driver contact the rider to arrange for pickup for a difficult pickup point.

The analysis engine 210 is configured to determine (e.g., predict) whether there may be an issue with a pickup or pickup point. More particularly, the analysis engine 210 analyzes historical trip data and real-time trip data to determine whether there is an issue associated with a pickup point that would warrant triggering a notification. The issue may involve a habitually late or tardy rider, a rider that is located far from the pickup point, or a difficult pickup point based on aspects associated with the location, such as location attributes (e.g., high-rise buildings, a venue with multiple exits), traffic, weather, geography (e.g., hilly), or road attributes (e.g., driver approaching on a wrong side from the pickup point, one way streets, no place to pull over). To enable these operations, the analysis engine 210 includes a tardy module 220, a distance module 222, and a location module 224. In some embodiments, a machine learning model trained by the machine learning engine 212 is used by the analysis engine 210 to determine whether there may be an issue with the pickup point.

The tardy module 220 is configured to determine whether to trigger a notification based on the user (e.g., rider) being a habitually late or tardy user. In some embodiments, the tardy module 220 accesses historical trip data, from the data storage 206, and analyzes the historical trip data. In some embodiments, the tardy module 220 applies an algorithm that detects, for a last number of trips (e.g., 10 trips) and/or over a past number of days (e.g., last 30 days), whether the user was tardy a percentage of time that exceeds a tardy percentage threshold (e.g., 50%). For example, if the user has been tardy for half or more than half the trips, the user may be indicated as a habitually late user. Lateness may be defined, in one embodiment, based on a driver having to wait 60 seconds or longer for the user to arrive at a pickup point. Alternative embodiments may use a different wait time to define lateness or use a different metric to measure lateness.

In some embodiments, lateness may be based on or consider other factors such as country, traffic, weather, or time of day. For example, a median wait time in India that is considered late may be different than a median wait time in the U.S. that is considered late. In some of these embodiments, a machine learning model is trained with training data including one or more of these factors. At runtime, the machine learning model is applied by the tardy module 220 to current (real-time) trip data (e.g., location of the user and pickup location, geography, traffic, current weather, time of day) to detect whether the user, given similar conditions, is habitually tardy to the pickup point.

If the tardy module 220 determines that the user is a habitually late user or habitually late in similar conditions, the tardy module 220 determines whether or when to trigger automatic transmission of a notification to the requester device 106a. For example, if the pickup time is greater than ten minutes (e.g., the driver ETA to the pickup point is greater than ten minutes), the notification may be transmitted at ten minutes from pickup time. However, if the pickup time is between five and ten minutes, then the notification may be transmitted at five minutes from pickup time. Finally, if the pickup time is in less than five minutes, no notification is sent. Alternative embodiments may utilize other times for triggering automatic transmission (or no transmission) of the notification and thus, automatic presentation of the notification on the user devices 106.

The distance module 222 is configured to determine whether to trigger a notification based on the user (e.g., rider) being far from the pickup point and likely to be late if they do not start walking to the pickup point. In example embodiments, the distance module 222 determines whether a distance from a current location of the user to the pickup point at a particular time to pickup (e.g., five minutes before the driver is estimated to arrive at the pickup point) is greater than a predetermined distance threshold. The predetermined distance threshold may be an average or median distance determined based on historical trip data for the user or for a plurality of users. If the distance is equal to or greater than the distance threshold, the distance module 222 triggers a notification to nudge the user to start walking to the pickup point (e.g., triggers the notification module 218 to generate and transmit the notification). For example, if the pickup ETA is in five minutes and the distance to the pickup point is more than 100 meters, then a notification is triggered.

In some embodiments, the distance threshold is dynamic and/or based on conditions associated with the pickup point. For example, a particular pickup point may be considered far at 60 meters based on geography (e.g., uphill), while a different pickup point may be considered far at 200 meters (e.g., flat area with straight streets). Thus, the geography of the pickup point area may be considered. Other factors that can affect whether a distance may be too far to arrive at the pickup point on time include traffic, weather, road attributes (e.g., number of lanes), and time of day (e.g., more crowded area during lunchtime or at 5 pm during the work week). In these embodiments, a machine learning model may be trained, based on various conditions (or sets of conditions) from historical data associated with the user, for different distance thresholds, as will be discussed further below. The distance module 222 then uses the machine learning model, at runtime, to determine, given the real-time conditions associated with the pickup point, whether the distance the user needs to walk to reach the pickup point is too far. In other words, the machine learning model is applied to the real-time conditions to identify the distance threshold.

In some cases, the user's average walking speed can be used by the distance module 222 to determine whether the user will reach the pickup point on time. For example, if the user is a fast walker (e.g., based on historical trip data), the user's walking estimated time of arrival at the pickup point will be less than for a slower walker. In this case, the user may be on time even if the distance is far for average users.

The location module 224 is configured to trigger a notification based on aspects of the location that may make the pickup point difficult to navigate or pickup at. In example embodiments, the location module 224 uses historical trip data to determine whether a particular area (e.g., hexagon) associated with the pickup point is hard to stop at (e.g., there is high friction around the area). The historical trip data may show, for example, that drivers make u-turns more frequently or that traffic is high in the area. In some cases, the historical trip data may include feedback from other users that indicate difficulties with pickups in that area (e.g., no area for the driver to stop). Other issues or friction can be detected by the location module 224. If the location module 224 detects that there is an issue with the pickup point, the location module 224 triggers a notification that provides a warning to the user that the pickup point is a hard place to get to. In some cases, the notification may suggest the user contact the driver at some point to arrange the pickup.

In some embodiments, the location module 224 may also use a machine learning model to determine if the pickup point may be difficult to stop at. Factors such as time of day, traffic, location attributes, road attributes, and weather may affect the pickup point. For example, rainy weather around rush hour will result in more vehicles at a particular pickup point than when the weather is nice or during the weekends or nighttime. In these embodiments, a machine learning model may also be trained with these factors. At runtime, the machine learning model is applied by the location module 224 to real-time factors or conditions to identify whether the pickup point will be difficult to stop at.

The machine learning engine 212 trains one or more machine learning models that are used by the analysis engine 210 to determine whether to trigger a notification. In various embodiments, the machine learning engine 212 uses data from past trips and indications of whether users were late to pickup points to train the machine learning models. As such, the machine learning engine 212 includes a feature extractor 226 and a training module 228.

The feature extractor 226 extracts features that are used to train the machine learning model. In example embodiments, the feature extractor 226 accesses historical trip data from the data storage 206 and/or data from other sources (e.g., weather and traffic sources). The feature extractor 226 extracts features (e.g., factors, conditions) from all this data such as, for example, user locations (e.g., at a time a trip request is made), pickup points, rider and driver feedback (e.g., indications of bad pickup points), times or timestamps (e.g., wait time of a driver; time of day), weather conditions at the pickup point, location attributes, road attributes, and/or traffic conditions at the pickup points. The feature extractor 226 may also extract or detect an indication whether a user is late to a pickup point for each trip.

The extracted features are then provided to the training module 228, which uses the extracted features to train one or more machine learning models. In some embodiments, a machine learning model is trained to identify situations when a user is habitually tardy for a pickup (e.g., late 50% or more of the time). For instance, the user may be habitually tardy for pickups afterwork (e.g., around 5 pm) when it is raining, but may not be habitually tardy for pickups at other times of the day during bad weather. Extracted features (or conditions) from past trips are used by the training module 228 to train the machine learning model to identify the various situations when the user is habitually tardy.

In some embodiments, a machine learning model is trained to identify distances that a user can walk within a certain time period (e.g., five minutes, ten minutes) with a plurality of different features (e.g., conditions/factors) and/or different combinations of features. For example, to go from a point A to point B, the user can walk different distances in the same amount of time based on traffic, weather, geography/location, time of day, and so forth. This machine learning model can then be applied at runtime to a current pickup point and location of rider to determine a distance threshold used by the distance module 222 in its analysis.

In some embodiments, a machine learning model is trained to identify poor pickup points. Factors such as time of day, traffic, geography, location or road attributes, and weather may affect pickup points. For example, a particular pickup point may be congested under certain conditions or road attributes around the pickup point may change under other conditions (e.g., more lanes during certain hours or with certain weather conditions). Thus, a machine learning model may also be trained based on these conditions. At runtime, the machine learning model is applied by the location module 224 to real-time factors or conditions to identify whether the pickup point will be difficult to stop at.

As additional feedback and trip data is received, the factors or conditions can change over time. Thus, the additional feedback and trip data can be used to retrain the one or more machine learning models. As a result, the machine learning models can become more accurate/refined or change with the changing conditions (e.g., user may start walking faster, roadway is widened with more lanes)—thus improving the accuracy of the network system 102. The training and retraining of the one or more machine learning models can occur at any time, during regular intervals (e.g., nightly, once a week), based on an event (e.g., when a certain amount of trip data is received), and/or be triggered manually.

Figure 3:
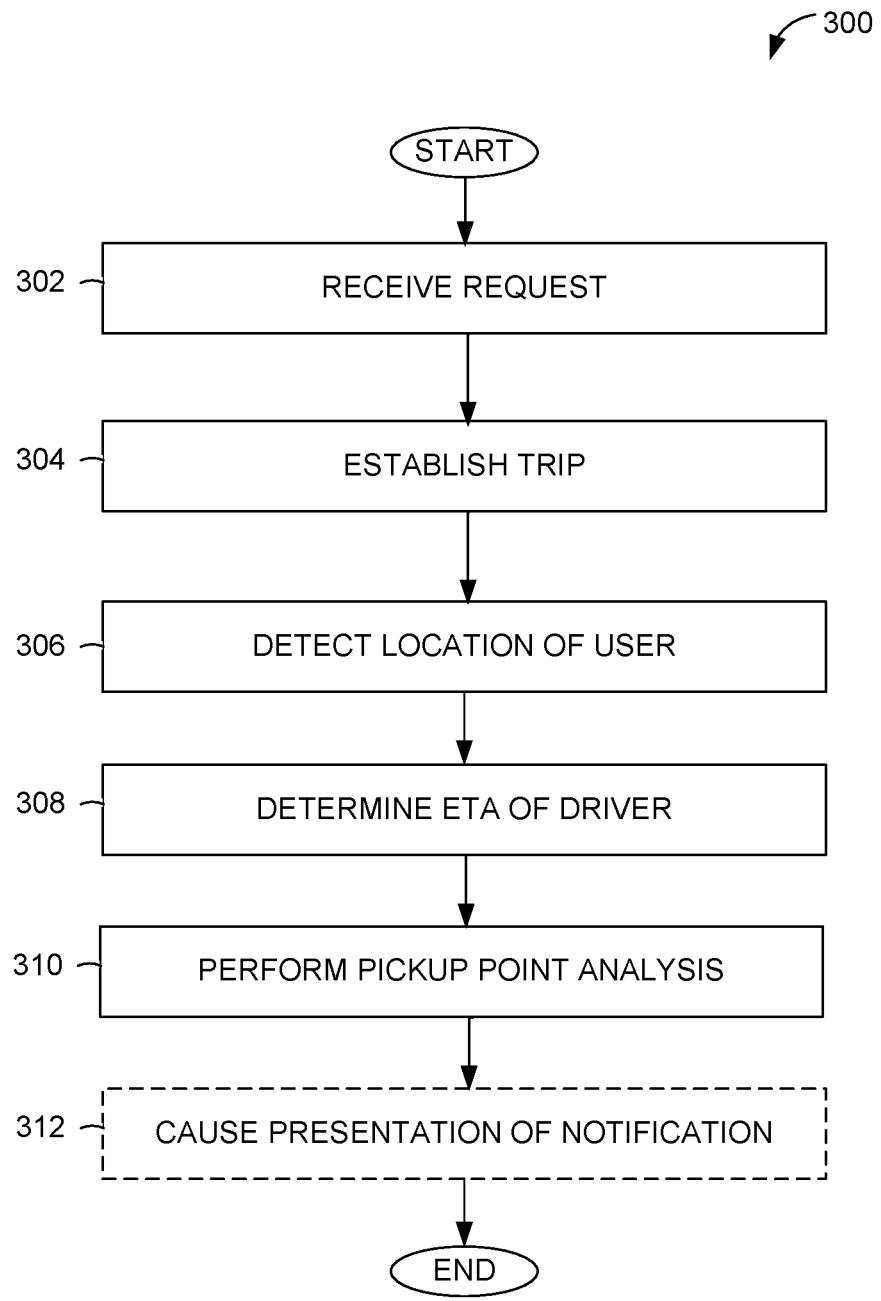
FIG. 3 is a flowchart illustrating operations of a method for providing pickup assistance, according to example embodiments.

FIG. 3 is a flowchart illustrating operations of a method 300 for providing pickup assistance, according to example embodiments. Operations in the method 300 may be performed by components of the network system 102 described above with respect to FIG. 2. Accordingly, the method 300 is described by way of example with reference to the network system 102. However, it shall be appreciated that at least some of the operations of the method 300 may be deployed on various other hardware configurations or be performed by similar components residing elsewhere in the network environment 100. Therefore, the method 300 is not intended to be limited to the network system 102.

In operation 302, the network system 102 receives a request from a user (e.g., requester or rider) for transportation service. In example embodiments, the data interface 202 receives the request and transmits the request to the service engine 208. The request includes an indication of a pickup point where the user will meet a driver.

In operation 304, the trip module 214 establishes a trip based on the request. Establishing the trip includes assigning the driver to provide the transportation service and determining a route for the driver to reach the pickup point.

In operation 306, a current location of the user is detected. In some embodiments, the monitoring module 216 starts tracking the location of the user when the request is made. In other embodiments, the location of the user may first be tracked when the user activates the client application 108 to make the request and subsequently tracked by the monitoring module 216. In example embodiments, the tracking uses data (or signals) received from one or more sensors associated with the user (e.g., GPS component of the requester device 106a).

In operation 308, the monitoring module 216 determines an ETA of the driver to the pickup point. The ETA is determined based on the route that was generated by the trip module 214 and known traffic conditions along the route.

In operation 310, the analysis engine 210 performs pickup point analysis which may trigger a notification or other actions to be automatically performed. The pickup point analysis uses the current location of the user and the ETA of the driver along with other data (e.g., historical data, weather, traffic) and, in some cases, one or more machine learning models to determine whether to trigger the notification. Operation 310 will be discussed in more detail in connection with FIG. 4-FIG. 6 below.

In operation 312, the notification module 218 causes presentation of the notification. In example embodiments, a component of the analysis engine 210 may provide a trigger to the notification module 218 to generate and transmit the notification based on its analysis. Therefore, operation 312 may not be triggered in all cases and is thus optional. If triggered, the notification module 218 pushes a notification to the requester device 106a. In some cases, the notification may be displayed via the client application 108, while in other cases, the notification may be displayed on a home screen of the requester device 106a. In some cases, the notification can comprise a message that nudges the user to start walking to the pickup point or continue walking to the pickup point. In other cases, the notification can provide a walking route to the pickup point, an option to change the pickup point, or a suggestion to contact the driver. Other forms of notifications are contemplated.

Figure 4:
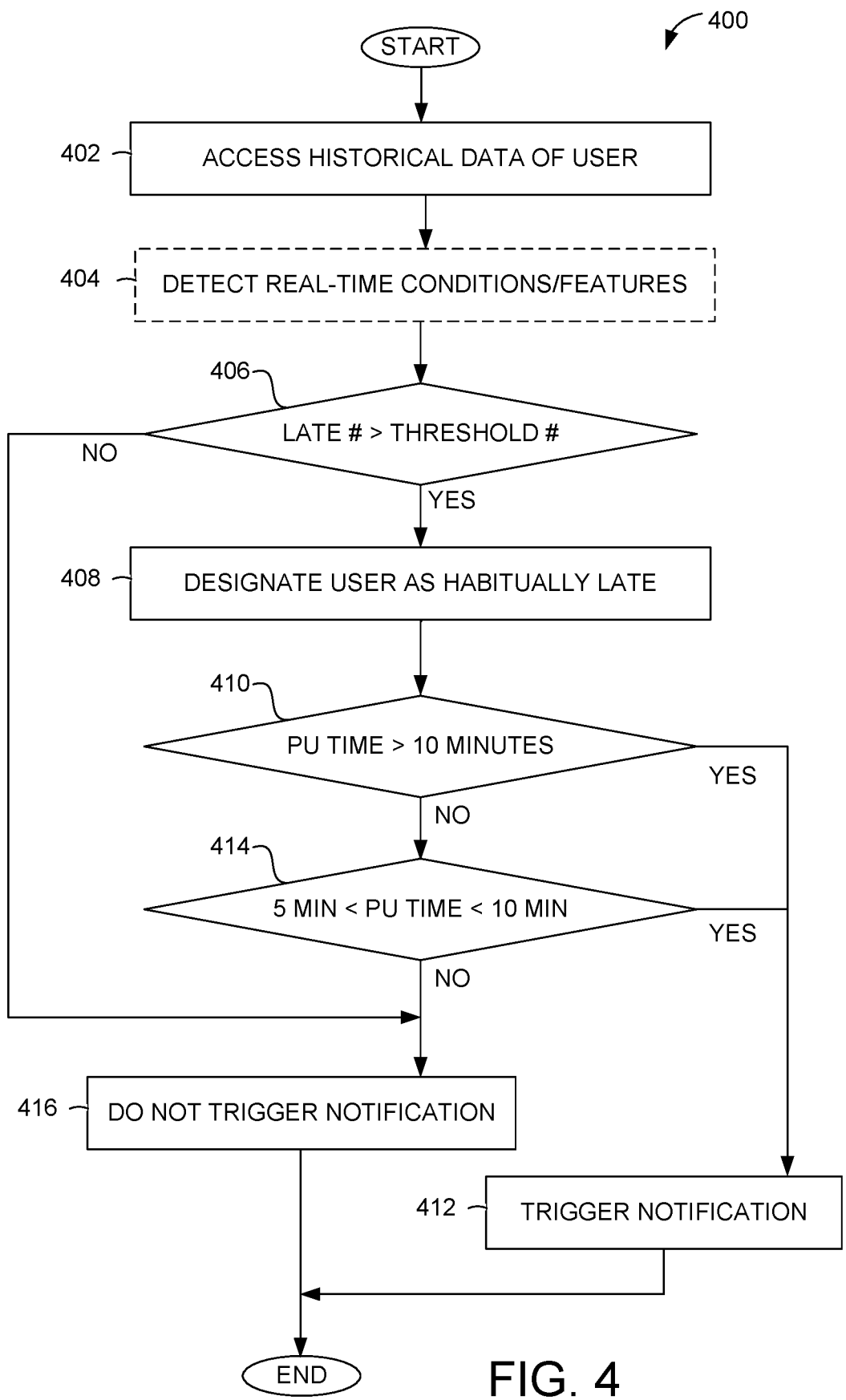
FIG. 4 is a flowchart illustrating operations of a method for performing habitually late detection analysis, according to example embodiments.

FIG. 4 is a flowchart illustrating operations of a method 400 for performing habitually late detection analysis, according to example embodiments. Operations in the method 400 may be performed by the network system 102, using components of the analysis engine 210 (e.g., tardy module 220) described above with respect to FIG. 2. Accordingly, the method 400 is described by way of example with reference to the analysis engine 210. However, it shall be appreciated that at least some of the operations of the method 400 may be deployed on various other hardware configurations or be performed by similar components residing elsewhere in the network environment 100. Therefore, the method 400 is not intended to be limited to the analysis engine 210.

In operation 402, the tardy module 220 accesses historical trip data of the user from the data storage 206. The accessed historical trip data may include data for trips over a certain period of time (e.g., last 3 months) or a particular number of trips (e.g., last ten trips of the user).

Additionally, the tardy module 220 can detect (e.g., access, retrieve) real-time conditions/features for the pickup point in operation 404. In some embodiments (e.g., without use of a machine learning model), operation 404 is optional or not performed.

In operation 406, the tardy module 220 makes a determination as to whether the user has been late a greater percentage of times than a tardy threshold. In the simplest embodiment, the tardy module 220 determines, for a last number of trips (e.g., 10 trips) and/or over a past number of days (e.g., last 30 days), whether the user was tardy a percentage of time that equals or exceeds a tardy percentage threshold (e.g., 50%). For example, if the user has been tardy for half or more than half the trips, the user may be indicated as a habitually tardy user in operation 408. However, if the tardy percentage threshold is not transgressed, then no notification is triggered in operation 416.

In more complex embodiments, determination of lateness may be based on or consider other factors/conditions such as country, traffic, weather, or time of day. In some of these embodiments, a machine learning model, trained with training data including one or more of these factors, is applied to real-time trip data (e.g., location of the user and pickup location, current weather, time of day), detected in operation 404, to detect whether the user is habitually tardy given the same or similar factors/conditions.

If the user is designated as a habitually late user, then in operation 410, a determination is made by the tardy module 220 whether the pickup time is greater than ten minutes away. The pickup time is based on the ETA of the driver to the pickup point. If the pickup time is greater than ten minutes away, the tardy module 220 triggers a notification to be automatically transmitted at ten minutes from pickup time in operation 412.

However, if the tardy module 220 makes a determination that the pickup time is between five and ten minutes away, then the tardy module 220 triggers a notification to be automatically transmitted at five minutes from pickup time in operation 412.

Finally, if the pickup time is in less than five minutes (as determined in operation 414), then no notification is sent in operation 416. It is noted that the times (e.g., between five and ten minutes, ten minutes away) are merely examples and that other times may be used for triggering the notification.

Figure 5:
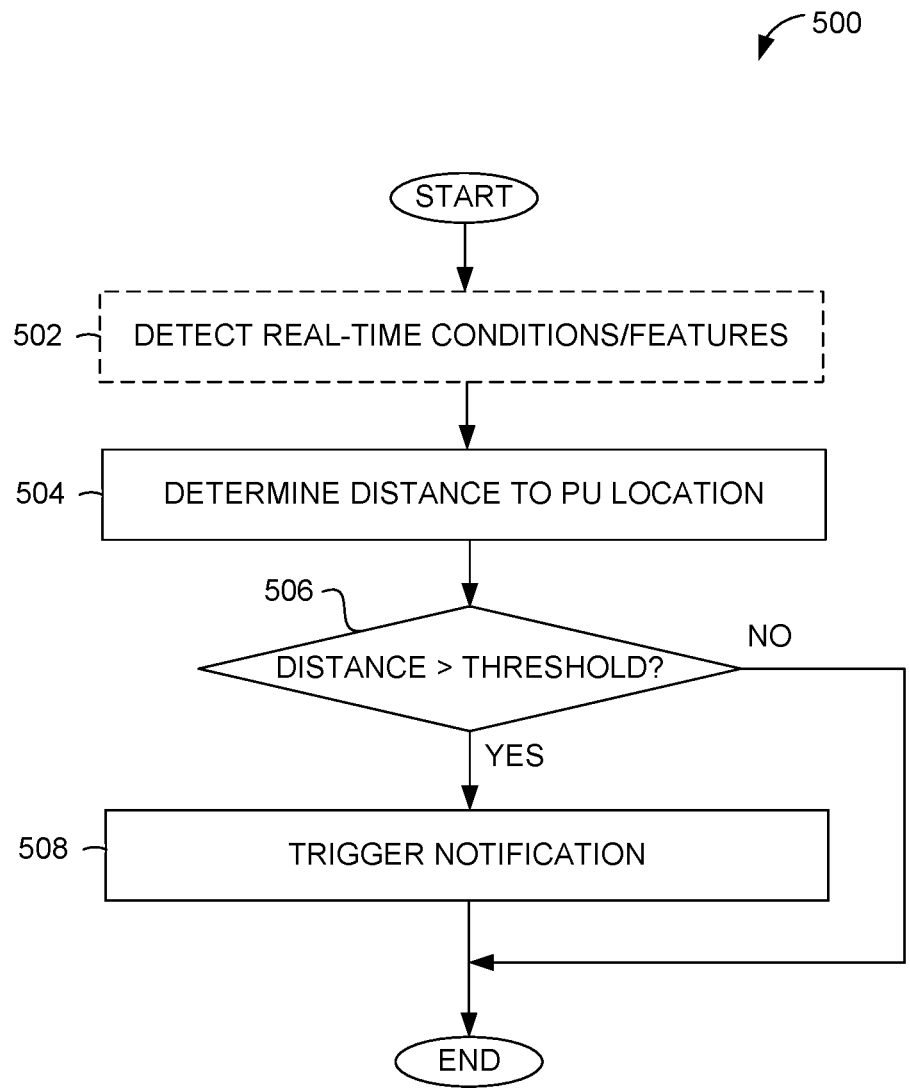
FIG. 5 is a flowchart illustrating operations of a method for performing far from pickup point detection analysis, according to example embodiments.

FIG. 5 is a flowchart illustrating operations of a method 500 for performing far from pickup point detection analysis, according to some example embodiments. Operations in the method 500 may be performed by the network system 102, using components of the analysis engine 210 (e.g., the distance module 222) described above with respect to FIG. 2. Accordingly, the method 500 is described by way of example with reference to the analysis engine 210. However, it shall be appreciated that at least some of the operations of the method 500 may be deployed on various other hardware configurations or be performed by similar components residing elsewhere in the network environment 100. Therefore, the method 500 is not intended to be limited to the analysis engine 210.

In operation 502, the distance module 222 can detect (e.g., access, retrieve) real-time conditions/features for the pickup point. In some embodiments (e.g., without use of a machine learning model), operation 502 is optional or not performed.

In operation 504, the distance module 222 determines a distance that the user needs to walk to reach the pickup location. Operation 504 may occur at a particular time before the driver is predicted to reach the pickup point. For example, the distance module 222 determines the distance at five minutes to the estimated pickup time (e.g., based on ETA of the driver to the pickup point).

In operation 506, the distance module 222 makes a determination whether the distance is greater than a distance threshold. In one embodiment, the distance threshold may be a median distance that the user or a plurality of users can generally walk within five minutes based on historical trip data. In some embodiments, other aspects can be considered in determining the distance that can be walked in the predetermined time before the driver's arrival at the pickup point such as, for example, weather, traffic, geography, or time of day. In these embodiments, a machine learning model trained for distance evaluation can be applied to the real-time factors or conditions (from operation 502) to identify the distance threshold that is used by the distance module 222.

In some cases, the distance module 222 may also use the user's average walking speed to determine a distance that the user can walk within a predetermined time period. For example, if the user is a fast walker (e.g., based on historical trip data), the user can walk farther than an average user.

If in operation 506, the distance is greater than the threshold distance, the distance module 222 triggers a notification in operation 508 to nudge the user to start walking (or continue walking) to the pickup point. For example, if the pickup ETA is in five minutes and the distance to the pickup point is more than 100 meters, then a notification may be triggered. While the user may still be late to the pickup point in some cases, a wait time of the driver may be reduced.

Figure 6:
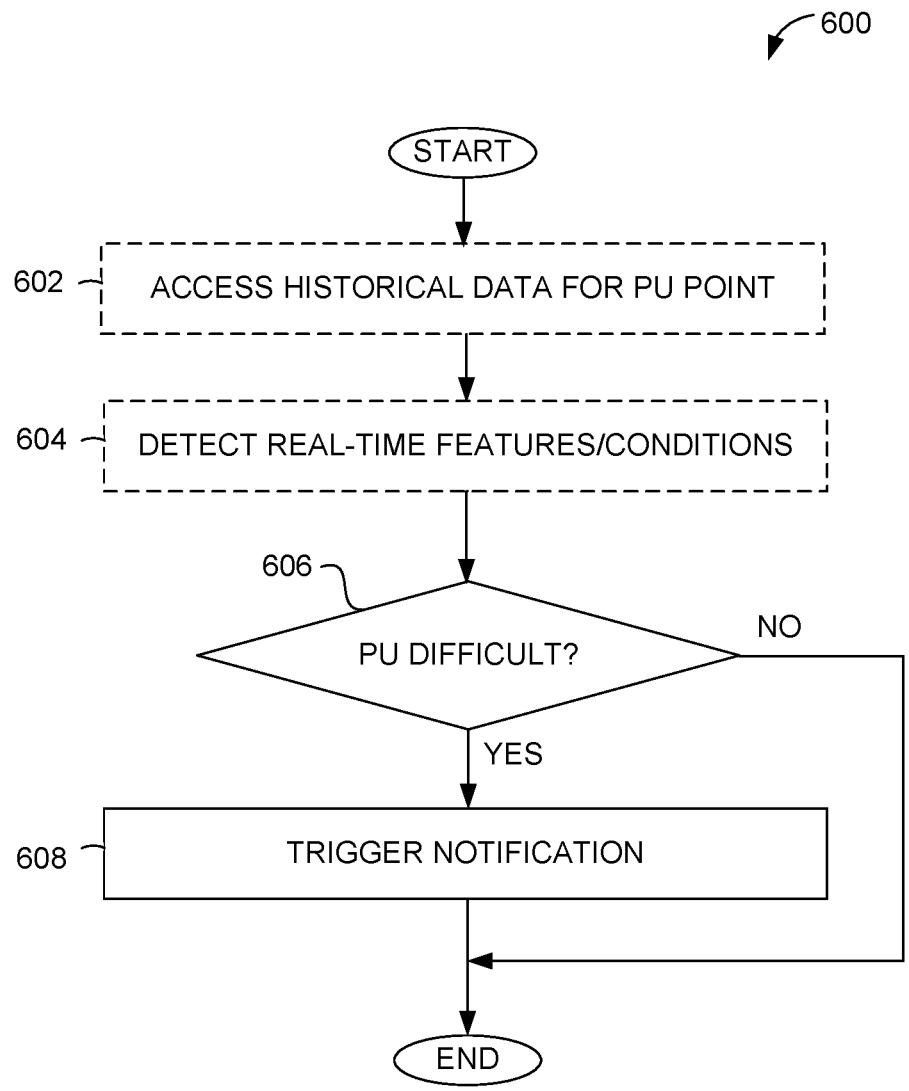
FIG. 6 is a flowchart illustrating operations of a method for performing difficult pickup point detection analysis, according to example embodiments.

FIG. 6 is a flowchart illustrating operations of a method 600 for performing difficult pickup point detection analysis, according to example embodiments. Operations in the method 600 may be performed by the network system 102, using components of the analysis engine 210 (e.g., location module 224) described above with respect to FIG. 2. Accordingly, the method 600 is described by way of example with reference to the analysis engine 210. However, it shall be appreciated that at least some of the operations of the method 600 may be deployed on various other hardware configurations or be performed by similar components residing elsewhere in the network environment 100. Therefore, the method 600 is not intended to be limited to the analysis engine 210.

In operation 602, the location module 224 accesses historical data for the pickup point. In example embodiments, the location module 224 uses the historical trip data to determine whether a particular area (e.g., hexagon) associated with the pickup point is hard to stop at (e.g., there is high friction around the area). The historical trip data may show, for example, that drivers make u-turns more frequently, that traffic is high in the area, that feedback from other users indicate difficulties with pickups in that area (e.g., no area for the driver to stop), and so forth. In some embodiments (e.g., with the use of a machine learning model), operation 602 is optional or not performed.

In operation 604, the location module 224 can detect (e.g., access, retrieve) real-time conditions/factors for the pickup point. The real-time conditions can include, for example, a time of day, traffic, geography, location attributes, road attributes, or weather. In some embodiments (e.g., without use of a machine learning model), operation 604 is optional or not performed.

In operation 606, the location module 224 makes a determination if the pickup point is difficult to stop at. The location module 224 may analyze the historical data, from operation 602, to determine whether the current pickup point has historically been a difficult pickup point. Alternatively or additionally, the location module 224 can apply a machine learning model that has been trained to identify difficult pickup points to the real-time features/conditions for the pickup point detected in operation 604. If, for similar conditions, pickup points were difficult (e.g., caused a lot of negative feedback, had long wait time, had many late pickups), then the current pickup point may be identified as a difficult pickup point.

If the location module 224 detects that there is an issue with the pickup point, the location module 224 triggers a notification, in operation 608. The notification provides a warning to the user that the pickup point is a hard place for a pickup. In some cases, the notification may suggest that the user contact the driver to coordinate the pickup.

Figure 7:
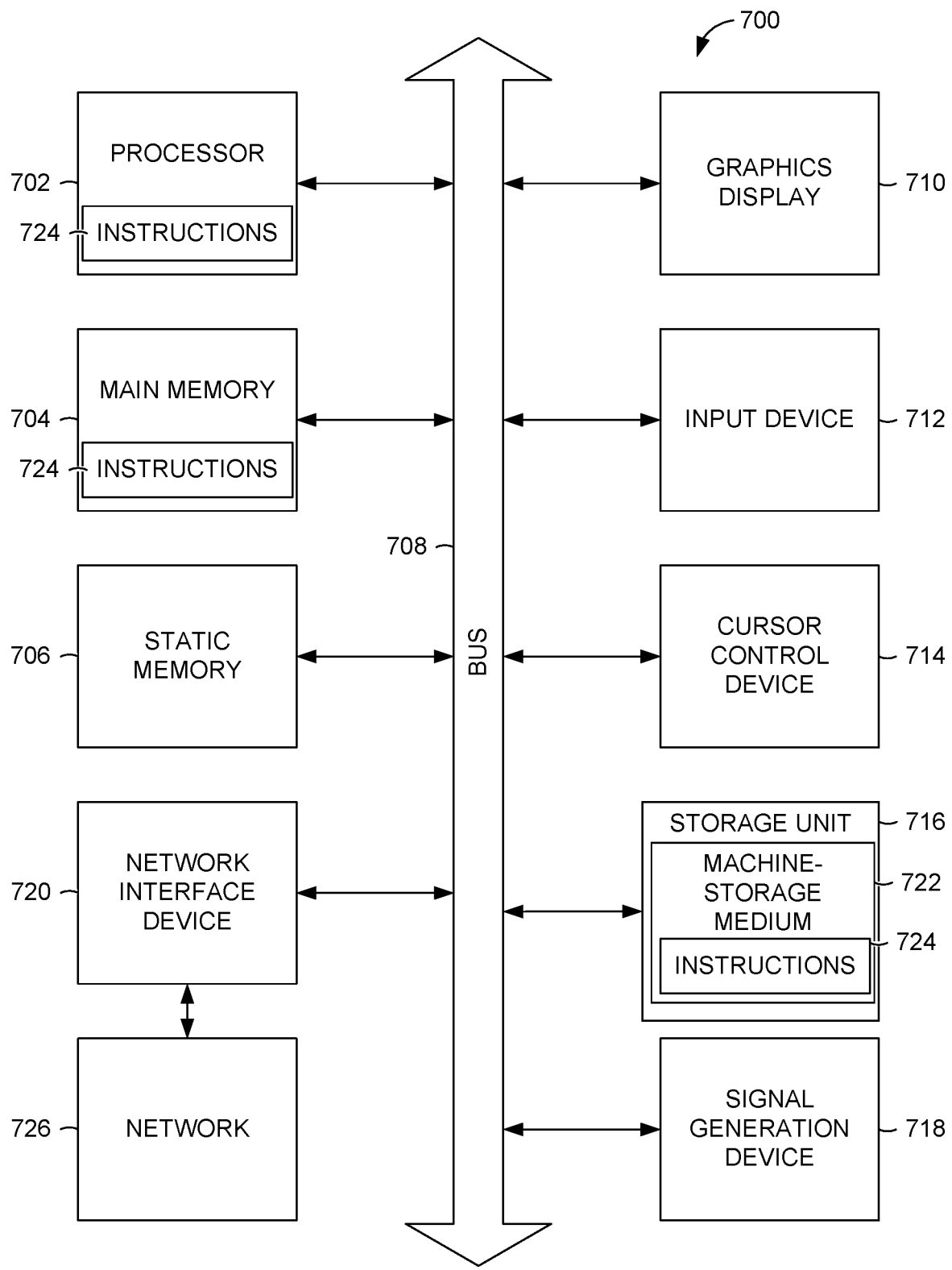
FIG. 7 is a block diagram illustrating components of a machine, according to some example embodiments, able to read instructions from a machine-storage medium and perform any one or more of the methodologies discussed herein.

FIG. 7 illustrates components of a machine 700, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 7 shows a diagrammatic representation of the machine 700 in the example form of a computer device (e.g., a computer) and within which instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the flow diagrams of FIG. 3 through FIG. 6. In one embodiment, the instructions 724 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, or a cathode ray tube (CRT), or any other display capable of displaying graphics or video). The machine 700 may also include an input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-storage medium 722 on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered as machine-storage media (e.g., tangible and non-transitory machine-storage media). The instructions 724 may be transmitted or received over a network 726 via the network interface device 720.

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (e.g., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium/media, computer-storage medium/media, and device-storage medium/media 722 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage medium/media and signal medium/media. Thus, the terms include both storage devices/media and carrier waves/modulated data signals.

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for providing pickup point assistance. The method comprises detecting, using data received from one or more sensors, a location of a user that is requesting a transportation service; tracking, by a network system, a driver along a route to the pickup point, the driver providing the transportation service to the user; based on the tracking, determining, by the network system, an estimated time of arrival (ETA) of the driver at the pickup point; using the location of the user and the ETA of the driver, performing, by the network system, analysis to determine whether an issue exists that affects the rider arriving at the pickup point on time to meet the driver; and based on the analysis, triggering automatic transmission, by the network system, of a notification to the user regarding the issue, the notification being displayed on a device of the user.

In example 2, the subject matter of example 1 can optionally include wherein the performing the analysis comprises determining that the user is habitually late.

In example 3, the subject matter of any of examples 1-2 can optionally include wherein determining that the user is habitually late comprises accessing historical trip data for the user; determining a percentage of trips that the user was late to a corresponding pickup point; and detecting that the percentage is greater than a percentage threshold, the triggering automatic transmission being in response to the detecting that the percentage is greater than the percentage threshold.

In example 4, the subject matter of any of examples 1-3 can optionally include wherein the automatic transmission of the notification is triggered at ten minutes based on a time for pickup being more than ten minutes away and is five minutes for a pickup time between five minutes and ten minutes away.

In example 5, the subject matter of any of examples 1-4 can optionally include wherein detecting that the user is habitually late comprises accessing real-time data associated with the pickup point, the real-time data comprising one or more of a time of day, traffic, geography, or weather; and applying the real-time data to a machine learning model trained to identify whether the user is habitually late.

In example 6, the subject matter of any of examples 1-5 can optionally include wherein performing the analysis comprises determining a distance from the location of the user to the pickup point at a particular time before pickup; and determining that the distance at the particular time before pickup is greater than a distance threshold, the triggering automatic transmission being in response to the determining that the distance is greater than the distance threshold.

In example 7, the subject matter of any of examples 1-6 can optionally include accessing real-time data associated with the pickup point, the real-time data comprising one or more of a time of day, traffic, geography, or weather; and applying the real-time data to a machine learning model trained to identify the distance threshold.

In example 8, the subject matter of any of examples 1-7 can optionally include wherein performing the analysis comprises accessing data associated with the pickup point; and detecting that the pickup point is difficult to stop at, the triggering automatic transmission being in response to the detecting that the pickup point is difficult to stop at.

In example 9, the subject matter of any of examples 1-8 can optionally include wherein the data associated with the pickup point comprises real-time data, the real-time data comprising one or more of a time of day, traffic, geography, location attributes, road attributes, or weather; and detecting that the pickup point is difficult to stop at comprises applying the real-time data to a machine learning model trained to identify whether the pickup point is difficult to stop at.

In example 10, the subject matter of any of examples 1-9 can optionally include extracting features from historical trip data associated with the user, the extracted features including one or more of traffic, weather, geography, distance walked to pickup points, or time of day for each previous trip; and using the extracted features, training a machine learning model that is used to identify a distance threshold for a user.

In example 11, the subject matter of any of examples 1-10 can optionally include extracting features from historical trip data associated with the user, the features including one or more of traffic, weather, geography, or time of day for each previous trip; and using the extracted features and an indication of whether the user was late for previous trips, training a machine learning model that is used to identify whether the user is a habitually late user.

In example 12, the subject matter of any of examples 1-11 can optionally include extracting features from historical trip data associated with the pickup point, the features including one or more of traffic, weather, geography, user feedback, location attributes, road attributes, or time of day for each previous trip; and using the extracted features and indications of whether users were late for previous trips, training a machine learning model that is used to identify whether the pickup point is difficult to stop at.

Example 13 is a system for providing pickup point assistance. The system includes one or more processors and a memory storing instructions that, when executed by the one or more hardware processors, causes the one or more hardware processors to perform operations comprising detecting, using data received from one or more sensors, a location of a user that is requesting a transportation service; tracking a driver along a route to the pickup point, the driver providing the transportation service to the user; based on the tracking, determining an estimated time of arrival (ETA) of the driver at the pickup point; using the location of the user and the ETA of the driver, performing analysis to determine whether an issue exists that affects the rider arriving at the pickup point on time to meet the driver; and based on the analysis, triggering automatic transmission of a notification to the user regarding the issue, the notification being displayed on a device of the user.

In example 14, the subject matter of example 13 can optionally include wherein the performing the analysis comprises determining that the user is habitually late, the determining that the user is habitually late comprises accessing historical trip data for the user; determining a percentage of trips that the user was late to a corresponding pickup point; and detecting that the percentage is greater than a percentage threshold, the triggering automatic transmission being in response to the detecting that the percentage is greater than the percentage threshold.

In example 15, the subject matter of any of examples 13-14 can optionally include wherein the performing the analysis comprises determining that the user is habitually late, the detecting that the user is habitually late comprises accessing real-time data associated with the pickup point, the real-time data comprising one or more of a time of day, traffic, geography, or weather; and applying the real-time data to a machine learning model trained to identify whether the user is habitually late.

In example 16, the subject matter of any of examples 13-15 can optionally include wherein performing the analysis comprises determining a distance from the location of the user to the pickup point at a particular time before pickup; and determining that the distance at the particular time before pickup is greater than a distance threshold, the triggering automatic transmission being in response to the determining that the distance is greater than the distance threshold.

In example 17, the subject matter of any of examples 13-16 can optionally include wherein the operations further comprise accessing real-time data associated with the pickup point, the real-time data comprising one or more of a time of day, traffic, geography, or weather; and applying the real-time data to a machine learning model trained to identify the distance threshold.

In example 18, the subject matter of any of examples 13-17 can optionally include wherein performing the analysis comprises accessing data associated with the pickup point; and detecting that the pickup point is difficult to stop at, the triggering automatic transmission being in response to the detecting that the pickup point is difficult to stop at.

In example 19, the subject matter of any of examples 13-18 can optionally include wherein the data associated with the pickup point comprises real-time data, the real-time data comprising one or more of a time of day, traffic, geography, location attributes, road attributes, or weather; and detecting that the pickup point is difficult to stop at comprises applying the real-time data to a machine learning model trained to identify whether the pickup point is difficult to stop at.

Example 20 is a machine-storage medium storing instructions for providing pickup point assistance. The instructions configures one or more processors to perform operations comprising detecting, using data received from one or more sensors, a location of a user that is requesting a transportation service; tracking a driver along a route to the pickup point, the driver providing the transportation service to the user; based on the tracking, determining an estimated time of arrival (ETA) of the driver at the pickup point; using the location of the user and the ETA of the driver, performing analysis to determine whether an issue exists that affects the rider arriving at the pickup point on time to meet the driver; and based on the analysis, triggering automatic transmission of a notification to the user regarding the issue, the notification being displayed on a device of the user.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   training, by a machine learning engine, one or more machine learning models using historical trip data including a machine learning model trained to identify distances that a user can walk within certain time periods based in part on a plurality of different conditions;
   detecting, via one or more sensors, a current location of the user that is requesting a transportation service from a pickup point, the user traveling from the current location to the pickup point;
   tracking, by a network system, a driver along a route to the pickup point, the driver providing the transportation service to the user;
   based on the tracking, determining, by the network system, an estimated time of arrival (ETA) of the driver at the pickup point;
   using the current location of the user and the ETA of the driver, performing, by an analysis engine of the network system, analysis to determine whether an issue exists that affects the user arriving at the pickup point on time to meet the driver, the performing the analysis comprising:
   determining a distance from the current location of the user to the pickup point at a particular time before pickup;
   detecting a set of real-time conditions at the pickup point;
   based on the set of real-time conditions at the pickup point, determining, by the trained machine learning model, a distance threshold for the user that indicates a distance that the user can walk within a certain time period based on the set of real-time conditions; and
   determining that the distance from the current location at the particular time before pickup is greater than the distance threshold for the user;
   automatically triggering, by the analysis engine, a notification module to generate and cause presentation of a personalized notification that nudges the user to proceed to the pickup point based on determining that the distance is greater than the distance threshold for the user; and
   using trip data of the transportation service, retraining, by the machine learning engine, the one or more machine learning models to account for changing conditions.

2. The method of claim 1, wherein the performing the analysis further comprises determining that the user is habitually late.

3. The method of claim 2, wherein determining that the user is habitually late comprises:
   accessing historical trip data for the user;
   determining a percentage of trips that the user was late to a corresponding pickup point; and
   detecting that the percentage is greater than a percentage threshold, the triggering the notification module being in response to the detecting that the percentage is greater than the percentage threshold.

4. The method of claim 2, wherein detecting that the user is habitually late comprises:
   accessing the set of real-time conditions associated with the pickup point, the set of real-time conditions comprising one or more of a time of day, traffic, geography, or weather; and
   applying the set of real-time conditions to a machine learning model trained to identify whether the user is habitually late.

5. The method of claim 1, wherein the automatically triggering the notification module to generate and transmits the notification occurs at ten minutes based on a time for pickup being more than ten minutes away and at five minutes for a pickup time between five minutes and ten minutes away.

6. The method of claim 1, wherein the set of real-time conditions comprises one or more of a time of day, traffic, geography, or weather.

7. The method of claim 1, wherein performing the analysis further comprises:
   accessing data associated with the pickup point; and
   detecting that the pickup point is difficult to stop at, the automatically triggering the notification module being further in response to the detecting that the pickup point is difficult to stop at.

8. The method of claim 7, wherein:
   the set of real-time conditions comprises one or more of a time of day, traffic, geography, location attributes, road attributes, or weather; and
   detecting that the pickup point is difficult to stop at comprises applying the set of real-time conditions to a machine learning model trained to identify whether the pickup point is difficult to stop at.

9. The method of claim 1, further comprising:
extracting features from historical trip data associated with the user, the extracted features including one or more of traffic, weather, geography, distance walked to pickup points, or time of day for each previous trip; and
using the extracted features, training a machine learning model that is used to identify the distance threshold for the user.

10. The method of claim 1, further comprising:
extracting features from historical trip data associated with the user, the features including one or more of traffic, weather, geography, or time of day for each previous trip; and
using the extracted features and an indication of whether the user was late for previous trips, training a machine learning model that is used to identify whether the user is a habitually late user.

11. The method of claim 1, further comprising:
extracting features from historical trip data associated with the pickup point, the features including one or more of traffic, weather, geography, user feedback, location attributes, road attributes, or time of day for each previous trip; and
using the extracted features and indications of whether users were late for previous trips, training a machine learning model that is used to identify whether the pickup point is difficult to stop at.

12. A system comprising:
one or more hardware processors; and
memory storing instructions that, when executed by the one or more hardware processors, cause the one or more hardware processors to perform operations comprising:
training, by a machine learning engine one or more machine learning models using historical trip data including a machine learning model trained to identify distances that a user can walk within certain time periods based in part on a plurality of different conditions;
detecting, via one or more sensors, a current location of the user that is requesting a transportation service from a pickup point, the user traveling from the current location to the pickup point;
tracking a driver along a route to a pickup point, the driver providing the transportation service to the user;
based on the tracking, determining an estimated time of arrival (ETA) of the driver at the pickup point;
using the current location of the user and the ETA of the driver, performing analysis to determine whether an issue exists that affects the user arriving at the pickup point on time to meet the driver, the performing the analysis comprising:
determining a distance from the current location of the user to the pickup point at a particular time before pickup;
detecting a set of real-time conditions at the pickup point;
based on the set of real-time conditions at the pickup point, determining, by the trained machine learning model, a distance threshold for the user that indicates a distance that the user can walk within a certain time period based on the set of real-time conditions; and
determining that the distance from the current location at the particular time before pickup is greater than the distance threshold;
automatically triggering a notification module to generate and cause presentation of a personalized notification that nudges the user to proceed to the pickup point based on determining that the distance is greater than the distance threshold for the user; and
using trip data of the transportation service, retraining, by the machine learning engine, the one or more machine learning models to account for changing conditions.

13. The system of claim 12, wherein the performing the analysis further comprises determining that the user is habitually late, the determining that the user is habitually late comprises:
accessing historical trip data for the user;
determining a percentage of trips that the user was late to a corresponding pickup point; and
detecting that the percentage is greater than a percentage threshold, the triggering the notification module being in response to the detecting that the percentage is greater than the percentage threshold.

14. The system of claim 12, wherein the performing the analysis further comprises determining that the user is habitually late, the detecting that the user is habitually late comprises:
accessing the set of real-time conditions associated with the pickup point, the set of real-time conditions comprising one or more of a time of day, traffic, geography, or weather; and
applying the set of real-time conditions to a machine learning model trained to identify whether the user is habitually late.

15. The system of claim 12, wherein the set of real-time conditions comprises one or more of a time of day, traffic, geography, or weather.

16. The system of claim 12, wherein performing the analysis further comprises:
accessing data associated with the pickup point; and
detecting that the pickup point is difficult to stop at, the automatically triggering the notification module being further in response to the detecting that the pickup point is difficult to stop at.

17. The system of claim 16, wherein:
the data associated with the pickup point comprises the set of real-time conditions, the set of real-time conditions comprising one or more of a time of day, traffic, geography, location attributes, road attributes, or weather; and
detecting that the pickup point is difficult to stop at comprises applying the set of real-time conditions to a machine learning model trained to identify whether the pickup point is difficult to stop at.

18. A machine-storage medium storing instructions that, when executed by one or more hardware processors of a machine, cause the machine to perform operations comprising:
training, by a machine learning engine, one or more machine learning models using historical trip data including a machine learning model trained to identify distances that a user can walk within certain time periods based in part on a plurality of different conditions;
detecting, via one or more sensors, a current location of the user that is requesting a transportation service from a pickup point, the user traveling from the current location to the pickup point;
tracking a driver along a route to a pickup point, the driver providing the transportation service to the user;

based on the tracking, determining an estimated time of arrival (ETA) of the driver at the pickup point;
using the current location of the user and the ETA of the driver, performing analysis to determine whether an issue exists that affects the user arriving at the pickup point on time to meet the driver, the performing the analysis comprising:
  determining a distance from the current location of the user to the pickup point at a particular time before pickup;
  detecting a set of real-time conditions at the pickup point;
  based on the set of real-time conditions at the pickup point, determining, by the trained machine learning model, a distance threshold for the user that indicates a distance that the user can walk within a certain time period based on the set of real-time conditions; and
  determining that the distance from the current location at the particular time before pickup is greater than the distance threshold for the user;
automatically triggering a notification module to generate and cause presentation of a personalized notification that nudges the user to proceed to the pickup point based on determining that the distance is greater than the distance threshold for the user; and
using trip data of the transportation service, retraining, by the machine learning engine, the one or more machine learning models to account for changing conditions.

* * * * *

UNITED STATES PATENT AND TRADEMARK OFFICE
CERTIFICATE OF CORRECTION

| | | |
|---|---|---|
| PATENT NO. | : 12,480,770 B2 | Page 1 of 1 |
| APPLICATION NO. | : 18/056277 | |
| DATED | : November 25, 2025 | |
| INVENTOR(S) | : Shukla et al. | |

It is certified that error appears in the above-identified patent and that said Letters Patent is hereby corrected as shown below:

On the Title Page

In item (71), in "Applicant", in Column 1, Line 1, delete "TEchnologies," and insert --Technologies,-- therefor In the Claims In Column 23, Line 34, in Claim 12, delete "engine" and insert --engine,-- therefor Signed and Sealed this
Thirteenth Day of January, 2026

John A. Squires
*Director of the United States Patent and Trademark Office*